United States Patent [19]

All et al.

[11] Patent Number: 5,246,756
[45] Date of Patent: Sep. 21, 1993

[54] RELEASE SHEET

[75] Inventors: Frank E. All, Newark; Pang-Chia Lu, Pittsford; Leland W. Reid, Palmyra; Ralph J. Weber, Fairport, all of N.Y.

[73] Assignee: Mobil Oil Corporation, Fairfax, Va.

[21] Appl. No.: 827,312

[22] Filed: Jan. 29, 1992

[51] Int. Cl.⁵ .............................................. C09J 7/02
[52] U.S. Cl. .................................... 428/40; 428/352; 428/354
[58] Field of Search .......................... 428/40, 352, 354

[56] References Cited

U.S. PATENT DOCUMENTS

| | | | |
|---|---|---|---|
| 4,348,454 | 9/1982 | Eckberg | 428/40 |
| 4,859,511 | 8/1989 | Patterson | 428/40 |
| 5,064,717 | 11/1991 | Suzuki | 428/352 |
| 5,084,354 | 1/1992 | Krankkala | 428/40 |

Primary Examiner—Jenna L. Davis
Attorney, Agent, or Firm—Alexander J. McKillop; George W. Hager, Jr.

[57] ABSTRACT

A composite sheet of a polymeric film form base liner, a cured release coating laminated to at least one side of the base liner, and a coating of at least one high surface energy material (a surfactant/emulsifier) on at least one surface of the base liner.

13 Claims, No Drawings

RELEASE SHEET

This invention relates to composite film form materials suitable for use as release sheets. It more specifically refers to such composite materials having improved ink adhesion characteristics.

BACKGROUND AND INVENTION AND PRIOR ART

Composite polymeric film form materials are well known in the plastics art. It is well known to make such a composite of a construction such that it is usable for applying releasably secured film form material thereto, such as peelable labels.

In the known construction, a base liner of suitable film form material has a release coating applied to at least one surface thereof. A tacky adhesive material is applied to the surface of a suitable face stock and the face stock is releasably adhered to the base liner by contact of this tacky adhesive with the release coating.

The release coating is a material which adheres well to the base liner but has the property of only lightly holding, and therefore easily releasing, the adhesive coated face stock film form material which is applied thereover. This structure allows the production of peelable labels and the like in a most efficient fashion.

In this sort of composite film form material, it is conventional to make the release coating out of an electron beam curable composition comprising a silicone resin to which crosslinkable groups, such as acrylic residues, have been appended. The silicone portion of the composition acts as a release agent, and the acrylic groups act to crosslink the release coating composition together and to bond this composition to the base liner surface.

It has been found that, although this composite structure works well and constitutes a commercially available material, there are some things about this structure which perform less than satisfactorily. It has been found that, when the composite of the release coating and the base liner is made as an extended length film, and it is rolled up upon itself for storage, subject to later use by having face stock suitably applied thereto, portions of the release coating composition apparently do not sufficiently crosslink when subjected to the conventional curing processes. It is not known if these uncrosslinked portions of the release compositions do not have acrylic substituents, or if they do have such substituents and just have not reacted sufficiently to be well bonded into the release coating.

In any case, whatever is the reason, these more mobile portions of the release coating composition, principally those portions which are on the exposed surface of the release coating, called in the industry "loose juice", tend not to remain in the release coating composition layer. Upon the composite base liner and release coating being rolled up for storage or shipping, these portions come loose and transfer to the other side of the base liner; that is the back side of the base liner which is in contact with the release coating when the composite is rolled up. Upon transfer of this material to the back side of the base liner, it interferes with the later printing of indicia on this back side of the composite film.

Further, when the composite film material is unrolled, and a face stock is adhered over the release sheet, it is conventional practice to once again roll up this new composite, of base liner, release coating, and face stock, for storage and transportation. Just as some of the loose juice tended to transfer from the release coating to the back of the base liner when the original composite was rolled up, some of the loose juice, which had previously transferred to the back of the base liner, then tends to retransfer to the top of the face stock when this composite is rolled up. In this location, the transferred loose juice interferes with the adhesion of inked indicia sought to be printed on the top of the face stock.

Still further, the presence of unbonded silicone moieties which exist in the release sheet tend to be detrimental to this product even if they do not transfer to the back of the base liner. Even if some of this loose juice transfers to the back of the base liner, still more of it stays in the release coating. At least some of the loose juice which remains in the release coating tends to migrate to the tacky adhesive on the face stock and reduces or eliminates its tackiness. The peelable face stock is necessarily tacky in this product or it will not adhere to another surface after it has been peeled from the base liner. If the tackiness of the adhesive is reduced or eliminated, the face stock cannot be used for its intended purpose.

OBJECTS AND BROAD STATEMENT OF THIS INVENTION

It is therefore an important object of this invention to provide means to prevent or at least retard the transference of mobile components from the release coating, containing silicone molecules, out of the release coating and onto other surfaces.

It is another object of this invention to provide means for constructing a composite film form material made up of a base liner and a release coating having improved ink retention properties.

It is a further object of this invention to provide a composite film form material made up of: a base liner, a release coating, and a face stock releasably adhesively adhered to the release coating, which has improved ink retention properties on both the exposed surface of the base liner and of the face stock.

Other and additional objects of this invention will become apparent from a consideration of this entire specification as well as the claims appended hereto.

In accord with and fulfilling these objects, one aspect of this invention comprises a composite film form material comprising a film form base liner, a release coating adhered to at least one surface thereof, and a coating of a high surface energy material on at least one surface of said base liner. The release coating and the base liner are suitably conventional materials which are known to be used for this purpose. In many commercial applications, the base liner is a polymeric film.

Another aspect of this invention comprises a composite film form material comprising a film form base liner, a release coating adhered to at least one surface thereof, a face stock releasably adhesively adhered to at least one of the release coatings, and a coating of a high surface energy material on at least one surface of the base liner. As in the embodiment of this invention described above, the base liner, the release sheet, the face stock, and the adhesive releasably securing the face stock to the release coating are all conventional materials which are known to be used for this purpose.

According to this invention, the high surface energy material coating is disposed on at least one surface of the base liner. In the embodiment where there is a release coating disposed on one surface of the base liner, the high surface energy material may be coated on the other surface of the base liner, and/or it may be disposed on the surface of the base liner adjacent to and under the release coating, that is between the release coating and the base liner.

Where the release coating is disposed on both surfaces of the base liner, it is suitable to provide the high surface energy material between at least one of these release coatings and the base liner. In this embodiment, it is preferred to provide the high surface energy material between both release coatings and their respective adjacent base liner surfaces.

The high surface energy material is defined as a material having a high surface energy. Examples of such materials are conventional surfactants and emulsifiers. Such surfactants and emulsifiers should have a high surface wetting affinity to the composition comprising the silicone release coating. The high surface energy material can be ionic or non-ionic in nature. The non-ionic surfactants are preferred, with the most preferred surfactants being those which have a hydrophilic/lipophilic balance value (HLB) of about 4-30, preferably about 8 to 20.

The high surface energy materials are suitably put up in a composition comprising the surfactant/emulsifier material and a binder therefore. Where appropriate, this composition may also comprise a carrier, such as water or an organic solvent. The binder is necessary to both hold the high surface energy material together and to adhere it to the surface of the base liner. In an appropriate formulation, it is possible, and it is within the scope of this invention, that the high energy materials may be so constituted as to provide constituent portions of their molecules which act as the high surface energy material and other constituent portions which act as the binder. Thus, such compositions would be self binding. The high surface energy material/binder/carrier composition is suitable coated on the base liner surface, and the carrier removed in a conventional fashion. The binder is then conventionally crosslinked.

DETAILED DESCRIPTION OF THIS INVENTION

The base liner is a film form material which may be polymeric in nature. These materials are conventional in this art and are exemplified by: paper, oriented polypropylene, polyethylene terephthalate, polyethylene, polyamides, polystyrene, etc.

The release coating is a composition which, when applied to the base liner, has very low surface tack and therefore has the ability to readily release materials, particularly polymeric films, disposed thereon. In general, those silicone polymers which will release materials overlayed thereon, and which can be cured or crosslinked by conventional means, such as electron beam, ultraviolet radiation, heat, and the like, are appropriately used. An example of a material which is suited to use as a release coating in this invention is a silicone-acrylate composition. Exemplary of such compositions as those described in the E P 0281681-A1 patent by Goldschmidt. A.G.

It is common to use a composition for the release coating which is disposed on the base liner in an uncured form and is then cured in place. One of the techniques used to apply this release coating is to coat an uncured composition on a surface of the base liner and then to impinge an electron beam onto this composition for a time and under conditions suitable for converting this coating into a crosslinked film which is adhered to the surface of the base liner. The thus crosslinked release coating contains mostly crosslinked silicone acrylate moieties which are bound together and to the surface of the base liner.

The face stock is conventional film form material which is well known to be used for this service. Exemplary of materials which are suited to use in this service are films of paper, polyethylene terephthalate, polyethylene, polystyrene, metal foils, etc.

The adhesive is a conventional material which is well known to be used for this service. Exemplary of adhesive materials which are known to be used here are acrylic emulsions, such as those sold commercially under the name of XPLA-12 by the Dyna-tech company, styrene-butadiene rubber emulsions, such as those sold under the trade name Bond-master 72-9718 by National Starch, and hot melt adhesives, such as those sold under the trade name HL-2021 or HL2203X by the H. B. Fuller Company.

In a copending application Ser. No. 611,578, filed in Nov. 1990, by at least some of the inventors of this invention, the base liner is provided at the surface thereof which is adjacent the release coating, with a skin of a material having tougher physical properties. When the face stock is releasably secured to the release coating, and then die cut into suitable shapes, the cutting die is retarded from penetrating and cutting through the base liner by the presence of this tougher skin layer. Such a structure of the base liner is intended to be included within the instant specification, and the entire contents of that application is incorporated herein by reference.

According to this invention as aforesaid, a significant departure from the prior art resides in the application of a coating of a high surface energy coating material on either surface or both surfaces of the base liner. Examples of such materials are surfactants and emulsifiers, such as those which are listed in McCutcheon' Emulsifiers and Detergents, North American Edition, 1989. These include: polyethylene oxides such as those sold under the name Carbowax, particularly Carbowax-8000, by Union Carbide Corporation; block copolymers of propylene oxide and ethylene oxide, sold under the name of Pluronic, particularly Pluronic F-68 (HBL=29), by the Chemicals Division of BASF Corporation; alkyl polyethoxy ethanols, sold under the name of Triton, particularly Triton X-67 (HBL=16.7), by the Rohm and Haas Company; poly (methyl vinyl ether/maleic anhydride), sold under the name of Gantrez, particularly Gantrez AN-II9, by GAF Corporation; dioctyl ester of sodium sulfosuccinic acid, sold under the name of Aerosol, particularly Aerosol OT-100, by American Cyanamid Company; polyoxyethylene lauryl ether, sold under the name Brij, particularly Brij-35 (HBL=16.9) and Brij-700 (HBL=16,7), by ICI Americas; polyoxyethylene stearate, sold under the name of Myrj, particularly Myrj-52, by ICI Americas; sorbitan monostearate, sold under the name Span, particularly Span-60 (HBL=4.7), by ICI Americas; polyoxyethylene distearate, sold under the name of Pergosperse, particularly Pergosperse 400DS (HBL=7.8), by Lonza; polyoxyethylene (20) sorbitan tristearate, sold under the name of Tween, particularly Tween-65 (HBL=10.5), by ICI Americas; and ethylene glycol monostearate, sold under the name of Tegin, particularly Tegin EGMS/VA, by Goldschmidt Chemical Corp.

Where the high surface energy material is formulated with a separate binder, such binders are exemplified by: ethylene-acrylic acid emulsions, such as those which are commercially sold under the name Michem, particularly Michem-4983, by Michelman Corporation; acrylic emulsions, such as those sold under the name of Acrylic, particularly Acrylic 79XW318A and 89XW055, by Valspar Corporation; surlyn emulsions, sold under the name of Adcote, particularly Adcote 56220, by Morton International, specialty chemicals group; and melamine formaldehyde resins, sold under the name of Parez, particularly Parez-613, by American Cyanamid Company.

SPECIFIC EXAMPLES OF THE PRACTICE OF THIS INVENTION, AND BEST MODE CONTEMPLATED FOR PRACTICING THIS INVENTION

In the following examples, parts and percentages are by weight unless expressly stated to be on some other basis. These examples are illustrative of the practice of this invention, and are not to be construed as limiting on the scope thereof.

Base liner films of oriented polypropylene, each nominally 2 mils thick, were coated on their back side (except for sample 1) with water solutions of a series of high surface energy materials. The coatings were all applied in a coating weight of 0.25gm/1000 square inches. The front side of the base liner films were each coated with the same conventional silicone-acrylate release composition. The release coating side of the composite so formed was electron beam cured at a radiation dose of 2.5 rads, at a line speed of 50 feet per minute. The weight of the release coating was 0.6 gms/1000 square inches. The electron beam was supplied from an Electrocurtain CB-150 supplied by Energy Sciences Inc.

After curing, the composite films were rolled up in a conventional manner and stored in the rolled condition for seven (7) days. The back side of each composite film was imprinted with a #8800 Berol Magic Marker and the results rated as shown in the following Table 1:

TABLE 1

| sample # | front side coating | back side coating | back side magic marker rating* |
|---|---|---|---|
| 1 | silicone release | — | 1 |
| 2 | silicone release | PVOH/Parez | 2 |
| 3 | silicone release | Carbowax-8000/Parez | 7 |
| 4 | silicone release | Pluronic F-68/Parez | 9 |
| 5 | silicone release | Triton X-67/Parez | 9 |
| 6 | silicone release | Gantrez AN-119/Parez | 2 |
| 7 | silicone release | sodium carboxymethyl cellulose | 6 |
| 8 | silicone release | poly(2-ethyl)oxazoline | 8 |

*where:
1 — severe ink wetting problem
10 — no ink wetting problem.

As indicated by the above data, a layer of high surface energy coating material will greatly reduce the ink wetting problem on the back side.

It is clear from a consideration of these data that the application of the high surface energy coating of this invention substantially reduces the unwanted transference of silicone containing mobile fragments from the release sheet to the base liner.

In another set of comparative tests, a composite film consisting of an oriented polypropylene base liner with a cured silicone-acrylate release coating, had various surfactants disposed on its backside, as set forth in the following table 2. This backside coating also contained 50% Surlyn (Adcoat-56220) as a binder. The thus constituted film was wound on itself in roll form and stored at 125° F. for three (3) days. At the end of the three (3) days of hot aging, the roll was unwound and flagged with uncoated oriented polypropylene and polyethylene terephthalate films, respectively. Each composite was then wound on itself in roll form, and then stored at 125° F. for an additional three (3) days. The roll was unwound, and the flag films were removed from the composite. The surface of the flag films which had been in contact with the backside of the base liner was evaluated for ink wet out and adhesion of a water based ink. The following table 2 shows a comparison of several runs using different high surface energy coating materials.

The release coating was a silicone-acrylate composition (known commercially as RC-450) which was applied at a coating rate of 0.7 g/1000 square inches. The release coating was cured at 2.5 Mrad.

The ink adhesion was tested by applying Scotch brand 610 tape to the test surface and then peeling it off. The first reported number represents the area of ink left on the surface after peel off. The second reported number refers to a control sample test where the inked surface did not touch any surface of the release coating layer.

The ink wet out value was measured by applying a Berol marker to the surface and evaluating the result. The values range from 1, which is the poorest, to 10, which is the best. In the following table, OPP refers to oriented polypropylene film, and PET refers to polyethylene terephthalate film.

TABLE 2

| Coating material | Ink wet out | OPP ink adhesion | PET ink adhesion |
|---|---|---|---|
| None | 1 | 5%/100% | 70%/100% |
| Pluronic 25R8 | 9 | 50%/100% | 100%/100% |
| Triton X-67 | 8 | 70%/100% | 100%/100% |
| EGMS-VA | 8 | 60%/100% | 100%/100% |
| Myrj-59 | 9 | 30%/100% | 100%/100% |

It is clear from a consideration of these data that the application of the high surface energy coating of this invention substantially reduces the unwanted transference of silicone containing mobile fragments from the release sheet to the face stock.

What is claimed is:

1. In a composite, self supporting, flexible sheet comprising a film form base inner having laminated to at least one side thereof a release coating comprising:
   cured silicone-acrylate, and
   moieties of silicone-acrylate which are cured to an insufficient extent that such upon storage they tend to migrate out of said release coating to a surface thereof and therefore interfere with ink receptivity;
   the improvement, whereby ameliorating the interference of said moieties with ink receptivity, which comprises on at least one side of said base liner, a coating of a surfactant/emulsifier material in an amount sufficient to at least reduce said migration of said insufficiently cured silicone-acrylate.

2. The improved composite sheet claimed in claim 1 wherein said coating consists essentially of said surfactant/emulsifier, and is disposed between said base liner and said release coating.

3. The improved composite sheet claimed in claim 1 wherein said surfactant/emulsifier coating is disposed on the side of said base liner opposite to the side having said release coating.

4. The improved composite sheet claimed in claim 2 including ink indicia disposed on the side of said base liner opposite to said release coating.

5. The improved composite sheet claimed in claim 1 including tacky adhesive releasably adhered to said release coating.

6. The improved composite sheet claimed in claim 5 including a film releasably secured to said adhesive.

7. The improved composite sheet claimed in claim 1 including a face layer having tacky adhesive on at least one surface thereof, releasably adhered to said release coating through said tacky adhesive.

8. The improved composite sheet claimed in claim 1 wherein said surfactant is at least one member selected from the group consisting of a polyethylene oxide, a block copolymer of propylene oxide and ethylene oxide, an alkyl polyethoxy ethanol, a methyl vinyl ether/maleic anhydride copolymer, a dioctyl ester of sodium sulfosuccinic acid, a polyoxyethylene lauryl ether, a polyoxyethylene stearate, a sorbitan monostearate, a polyoxyethylene distearate, and an ethylene glycol monostearate.

9. The improved composite sheet claimed in claim 2 or 3 wherein said surfactant/emulsifier is combined with a binder.

10. The improved composite sheet as claimed in claim 9 wherein said binder is at least one member selected from the group consisting of an ethylene-acrylic acid copolymer, an acrylic polymer, an ionomer, and a melamine-formaldehyde resin.

11. The improved composite sheet claimed in claim 1 wherein said base liner is selected from the group consisting of paper, oriented polypropylene, polyethylene, polyamide, polystyrene and polyethylene terephthalate.

12. The improved composite sheet claimed in claim 6 wherein said film is selected from the group consisting of paper, oriented polypropylene, polyethylene terephthalate, polyethylene, polystyrene, and metal foil.

13. The improved composite as claimed in claim 9 wherein said binder comprises up to 50% of said coating.

* * * * *